US010791472B2

(12) United States Patent
Harrow (10) Patent No.: US 10,791,472 B2
(45) Date of Patent: Sep. 29, 2020

(54) NETWORK ENTITY, A WIRELESS COMMUNICATION SYSTEM AND A METHOD FOR DERIVING A CELL CANDIDATE LIST FROM A NEIGHBOUR LIST

(71) Applicants: ip.access Limited, Cambridge (GB); James Harrow, Fulbourn (GB)

(72) Inventor: James Harrow, Fulbourn (GB)

(73) Assignee: i.p. access Limited, Cambridge (GB)

( * ) Notice: Subject to any disclaimer, the term of this patent is extended or adjusted under 35 U.S.C. 154(b) by 0 days.

(21) Appl. No.: 16/332,094

(22) PCT Filed: Sep. 1, 2017

(86) PCT No.: PCT/EP2017/071981
§ 371 (c)(1),
(2) Date: Mar. 11, 2019

(87) PCT Pub. No.: WO2018/046403
PCT Pub. Date: Mar. 15, 2018

(65) Prior Publication Data
US 2019/0373487 A1    Dec. 5, 2019

(30) Foreign Application Priority Data
Sep. 12, 2016    (GB) .................................. 1615426.2

(51) Int. Cl.
*H04W 24/02*    (2009.01)
*H04W 84/04*    (2009.01)
*H04W 36/00*    (2009.01)

(52) U.S. Cl.
CPC ........ *H04W 24/02* (2013.01); *H04W 36/0083* (2013.01); *H04W 84/045* (2013.01)

(58) Field of Classification Search
CPC ............. H04W 84/045; H04W 36/061; H04W 36/00835; H04W 48/10; H04W 16/16;
(Continued)

(56) References Cited

U.S. PATENT DOCUMENTS

| 2012/0184312 A1* | 7/2012 | Yamamoto | ........... H04J 11/0053 455/502 |
| 2013/0225192 A1* | 8/2013 | Yamamoto | ............ H04W 16/16 455/452.1 |
| 2015/0312805 A1* | 10/2015 | Cui | ....................... H04W 80/04 370/331 |

FOREIGN PATENT DOCUMENTS

| GB | 2480432 A1 | 11/2011 |
| GB | 2526375 A1 | 11/2015 |

(Continued)

OTHER PUBLICATIONS

Huawei et al., "Consideration on cell specific priority" R2-152503, May 2015, 3GPP TSG-RAN WG2 Metting #90, Fukuoka, Japan, 3 pages. (Year: 2015).*

*Primary Examiner* — Quoc Thai N Vu
(74) *Attorney, Agent, or Firm* — Optimus Patents US, LLC (57) ABSTRACT

A method for a small cell access point to use neighbour cell broadcast information to derive a cell candidate list is described. The method comprises, at the small cell access point: performing a network listen, NWL, scan and identifying a broadcast transmission from a plurality of macro cell base station, BTSs; detecting at least one parameter from each broadcast transmission, wherein the at least one parameter acts as a signature for small cell neighbours to distinguish small cell neighbours from macro cell neighbours; and using the at least one parameter to derive a cell candidate list of candidate operating parameters.

14 Claims, 6 Drawing Sheets

(58) Field of Classification Search
CPC ..... H04W 24/02; H04W 88/08; H04W 16/32; H04W 36/04; H04W 36/0083
See application file for complete search history.

(56) References Cited

FOREIGN PATENT DOCUMENTS

| WO | 2011/022731 A1 | 2/2011 |
| WO | 2012/041835 A1 | 4/2012 |
| WO | 2012/0135120 A1 | 10/2012 |

\* cited by examiner

NETWORK ENTITY, A WIRELESS COMMUNICATION SYSTEM AND A METHOD FOR DERIVING A CELL CANDIDATE LIST FROM A NEIGHBOUR LIST

FIELD OF THE INVENTION

The field of this invention relates to network entities, a wireless communication system and a method for deriving a cell candidate list from a neighbour cell list. In particular, the field of this invention relates to network entities such as small cells, using information from a broadcast transmission to derive the cell candidate list.

BACKGROUND OF THE INVENTION

Wireless communication systems, such as the $3^{rd}$ Generation (3G) mobile telecommunication standards, are well known. An example of such 3G standards is the Universal Mobile Telecommunications System (UMTS™), developed by the $3^{rd}$ Generation Partnership Project (3GPP™) (www.3gpp.org). The $3^{rd}$ generation of wireless communications has generally been developed to support macro-cell mobile phone communications. Such macro cells utilise high power base stations (NodeBs in 3GPP™ parlance) to communicate with wireless communication units within a relatively large geographical coverage area. Typically, mobile wireless communication units, or User Equipment (UEs) as they are often referred to in 3G parlance, communicate with a Core Network (CN) of the 3G wireless communication system via a Radio Network Subsystem (RNS). A wireless communication system typically comprises a plurality of RNS, each RNS including one or more cells to which UEs may attach, and thereby connect to other communication units within, or through, the wireless communication system. 3GPP™ has proposed and ratified a subsequent standard: the Long Term Evolution (LTE™) standard, namely, an Evolved Universal Mobile Telecommunication System (UMTS™) Territorial Radio Access Network, (E-UTRAN), for a mobile access network, as well as a System Architecture Evolution (SAE) solution, referred to as an Evolved Packet Core (EPC), for a mobile core network.

UEs can access a core network through a 2G/3G radio access network (RAN) such as the Enhanced Data Rate for GSM Evolution, EDGE referred to as 'GERAN') or a Universal Mobile Telecommunication System Terrestrial Radio Access Network (UMTS™ Terrestrial referred to as RAN, UTRAN), and access the EPC through the E-UTRAN. Generally, the Core Network is responsible for switching and routing voice calls and data to and from wired telephone networks or the Internet. A wireless-based RAN is located between the Core Network and the UE. A known 3G RAN comprises a Node B that supports wireless communications in a macro cell, and a small cell access point, sometimes referred to as a Home NodeB (HNB), which supports wireless communications in a small cell, such as a femto or pico cell. The Node B is connected with a radio network controller (RNC), which in turn is linked with a Core Network that includes a Mobile Switching Centre (MSC) and other conventional network elements or subsystems. A UE may roam in and out of the coverage areas of the Node B or a HNB, with each network utilising the same MSC of the Core Network, and request access to the Core Network through any one of these access nodes.

Network Operators are seeking to exploit their radio spectrum by providing micro-location based tracking of anonymised UEs in their networks. The Network Operators already provide large-scale macro location insights using probes to monitor which UEs are using which macro cells and then combine this with other data sources (such as their customer relationship management (CRM) information, billing data and the web sites that the users visit). By combining these data sets in an anonymised form they can provide valuable data insights into what type of consumer visits what areas and what their typical journeys are. These can be provided to governments and transportation providers in order to assist with planning future capacity requirements or to aid in optimising of traffic routes.

Lower power (and therefore smaller coverage area) cells are a recent development within the field of wireless cellular communication systems. Such small cells are effectively communication coverage areas supported by low power base stations. The terms 'pico cell' and 'femto cell' are often used to mean a cell with a small coverage area, with the term femtocell being more commonly used with reference to residential small cells. Herein, the term 'small cell' encompasses any cell having a relatively small coverage area (i.e. a coverage area less than a typical macro cell) and includes pico cells and femto cells. The low power base stations that support small cells are referred to as Access Points (APs), with the term Home NodeB (HNB) or Evolved Home NodeB (HeNB) identifying small cell access points. These small cells are intended to augment the wide area macro cell network and support communications to User Equipment in a restricted, for example, indoor environment. An additional benefit of small cells is that they can offload traffic from the macro cell network, thereby freeing up valuable macro cell network resources.

With the increasing use of small cell HNB type devices instead of macro cells the operators can now provide location data at a much finer granularity (i.e. within a few meters). This has numerous retail applications, such as allowing a retailer to have insight into the type of people who frequent their stores (based on anonymous aggregated sightings). The use of HNB-type devices to provide location information is sometimes referred to as a 'Presence Cell', which works much like a HNB operating in a closed-access mode. In this manner, the HNB appears like any other cell in the operator's network in terms of UE reselection behaviour. A standard Presence Cell is configured to collect this location-related data but is typically provisioned to a single Mobile Network Operator (MNO). The Presence Cell would first ask UEs trying to access it for their unique identity and would then reject the UE back to the normal macro network. This can then provide a timestamp, UE identity and location (based on the fact that the coverage area of the Presence Cell is relatively small).

The MSC of the Core Network routes services for both the small cell and macro cell networks. Network Operators wishing to deploy small cells must ensure that the macro cell base transceiver station (BTS), such as Node B, broadcasts a frequency and scrambling code in its neighbour cell (NCell) list Typically all cells in the network may be assigned a set of 2-3 reserved UTRA absolute radio frequency channel numbers (UARFCN), (where UTRA is the air interface of the Universal mobile telecommunication system Terrestrial Radio Access) and scrambling codes to transmit on. The UARFCN can be used to calculate the carrier frequency. Traditionally the cells must be given the list of UARFCN/Scrambling codes to choose from and each cell chooses a unique scrambling code by first performing a network listen (NWL) scan, for example by monitoring the radio environment (REM) to determine an unused UARFCN/Scrambling code that is available.

Figure 1:
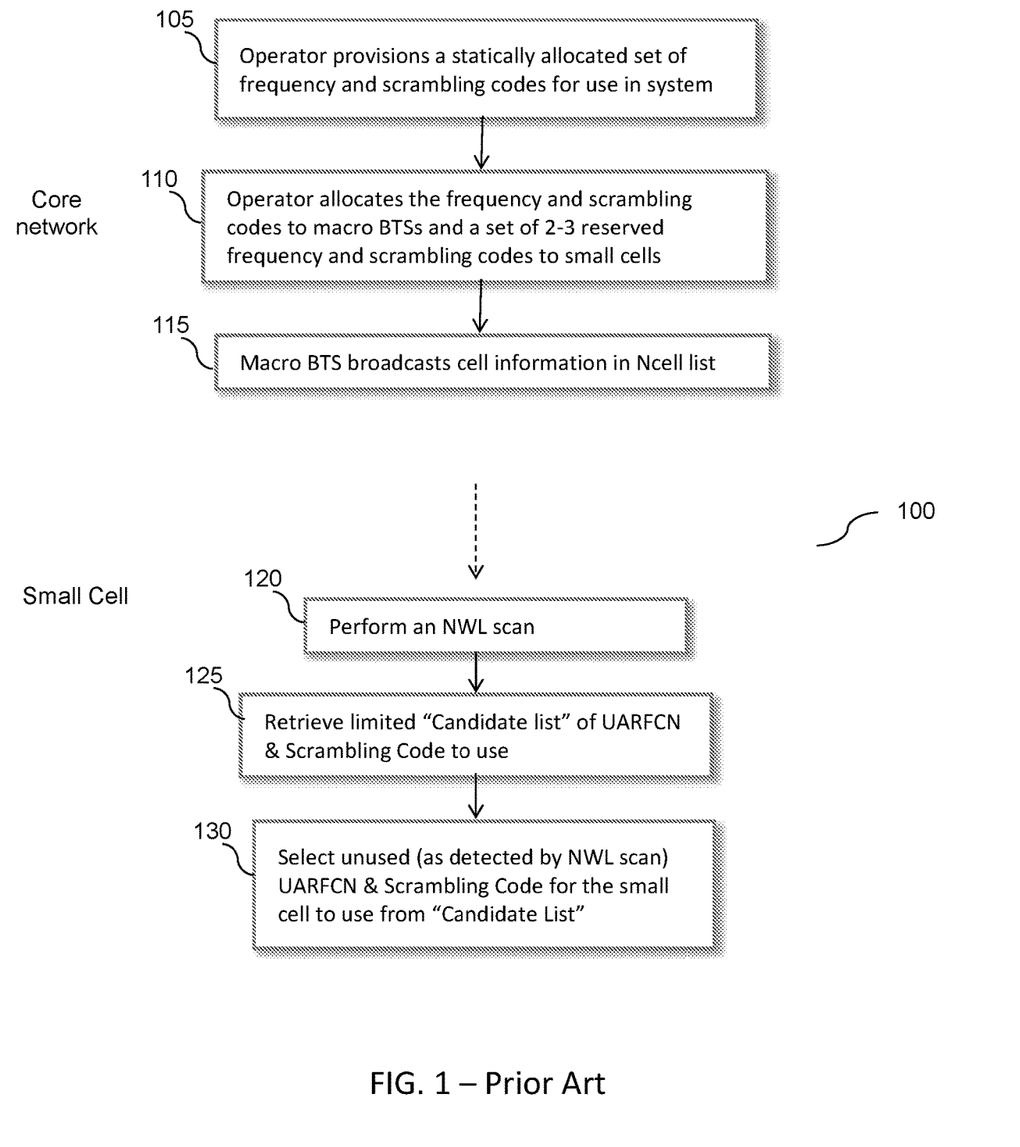
FIG. 1 illustrates a flowchart of a known small cell deployment process.

A typical small cell deployment process is illustrated in the flowchart 100 of FIG. 1. On the Core Network side, at 105, the Network Operator provisions a statically allocated set of frequency and scrambling codes for use in the system. At 110, the Network Operator allocates the frequency and scrambling codes to macro BTSs, and a set of 2-3 reserved frequency and scrambling codes to small cells. At 115, the macro cell BTS broadcasts cell information in a neighbour cell (Ncell) list. On the small cell side, a small cell performs a NWL operation at 120. At 125, the small cell must retrieve a limited "Candidate list" of UARFCN & scrambling codes to use from an Access Point Management System (AMS). At 130, the small cell selects unused UARFCN & scrambling codes (as detected by the NWL scan) for the small cell to use from the retrieved "Candidate List".

In effect, using a single set of UARFCN & scrambling codes parameters is not always practical for Network Operators to retrofit into their network. Instead some Network Operators prefer to allocate these UARFCN & scrambling codes manually to individual cells. Furthermore, a major problem for Network Operators is to ensure that the macro BTS system information block (SIB) message, which is constrained in length, is not accidentally pruned (e.g. due to attempting to add new macro cells that requires removal of lower priority cells to ensure that there are not too many neighbour cells in it), and thereby some small cell Frequency/Scrambling codes accidentally removed. This results in UEs being unable to find the small cell, and as such there would be no use of the small cell by UEs, or in the case of presence cells, no sightings would be detected (i.e. the cell is effectively invisible because the cell is not in the Macro cell neighbour list).

When deploying small cells, most Network Operators also adjust the SIB qOffset parameters (namely neighbour cell information broadcasts in SIB11 for UMTS™ networks, and broadcast in SIB4/SIB5 for LTE™ networks, on the broadcast control channel (BCCH)). In 3GPP™, biasing parameters, known as 'qOffsets', may be broadcast by NodeBs. Essentially the UEs make measurements and then subtract off the qOffset before using this to rank all of the cells against each other. The cell with the largest rank number is selected by the UE. A negative value makes the target cell more attractive, whereas a positive value makes the target cell less attractive. Thus, it is known for an operator to apply a strong negative offset for the small cell in the macro cell neighbour list in order to make the small cell transmitter appear more attractive, without needing the small cell to actually transmit at a very high power.

During day to day operation it is common for macro cell neighbour lists to be updated, and as above (due to constraints in SIB length) errors in the neighbour list configuration may be made with the small cell target frequency/scrambling code or Physical Cell ID (PCI) being omitted from SIB. This makes the deployment of a small cell ineffective, since the UEs will not be monitoring for those neighbours, and thus will be unlikely to find the target cell.

In some countries and regions, the macro operator's spectrum allocation is fragmented based on county or state, and as such the small cell frequency and scrambling code therefore need to be different in each geographic region. As some operators allow consumers to self-install their small cells (HNB), this presents a need for the location of the device to be well known before it is allowed to transmit, in case it broadcasts on another operator's spectrum allocation illegally. As such, many such HNBs are equipped with GPS receivers to determine their location. However, GPS™ is known not to work reliably indoors, where GPS signals may be weak. These reliability issues with location determination then require the end-user to call the operator's support help-desk in order to confirm the location of the HNB before it is allowed to operate. Only once the location is known can a set of allowed 'CandidateRFParameters' be sent by the AMS to the HNB, and the HNB then may perform an environment NWL scan to choose the best frequency and scrambling code from this candidate set. This also requires that the AMS supports a Geographic database to map location to RF Candidate Parameters, which may be used by the HNB. However, the AMS configuration is often kept separately to that of the macro SIB configuration, and it is therefore easy for human errors to cause a mismatch in configuration of the macro layer and the small cell layer.

The detection of macro cell and small cell misconfiguration requires either that the mobile network operator performs regular walk-tests and/or drive-tests to the site, or that an end-user spots a poor coverage area and reports this to the mobile network operator. Alternatively the mobile network operator may notice that the small cell is not seeing many UEs attaching to it via examination of the KPI reports that are automatically generated. As such, many small cells can start appearing to stop operating effectively. It then takes significant effort to understand why this situation has arisen, and restoring the system to a correct configuration may take several days. In some cases the problem situation may never even be discovered or understood.

Thus, the inventors have recognised that a need exists for a wireless communication system, a method and a small cell base station that supports a derivation of a cell candidate list from neighbour cell list that avoids small cells' Frequency/Scrambling codes being accidentally removed from the neighbour cell list, say due to errors in the list or due to constraints applied to the length of the SIB message, or which raises an alarm if that does happen, which mitigate the aforementioned disadvantages. In particular, it would be useful to employ a mechanism that may avoid, in certain scenarios, in having to inform the small cell at all of a constrained list of UARFCN and scrambling codes to be used, and instead have the small cell automatically derive the candidate list.

SUMMARY OF THE INVENTION

Aspects of the invention provide a method for a small cell to use information from a broadcast transmission to derive a cell candidate list from a neighbour cell list, a small cell access point, and a communication system as described in the appended claims.

In a first aspect of the invention, a method for a small cell base station/access point to use information to derive a cell candidate list from a neighbour cell list is described. The method comprises, at the small cell access point: performing a network listen, NWL, scan and identifying a broadcast transmission from a plurality of macro cell base station, detecting at least one parameter from each broadcast transmission, wherein the at least one parameter acts as a signature for small cell neighbours to distinguish small cell neighbours from macro cell neighbours; and using the at least one parameter to derive a cell candidate list of candidate operating parameters.

In this manner, by identifying and distinguishing small cell neighbours using the detected parameter that is able to act as a small cell signature, a cell candidate list may be derived from a neighbour cell list that avoids small cells' Frequency/Scrambling codes being accidentally removed from the neighbour cell list (as it is derived from the detected information from the macro cells and surrounding small cells). For example, this may avoid errors in the list or due to constraints applied to the length of the SIB message. Advantageously, the Network Operator may not have to be concerned about rigidly applying a global frequency plan, for example reserving the same small cell UARFCN/Scrambling codes on all macro cells, thereby providing greater planning flexibility. Furthermore, some Network Operators may no longer require a GPS fix from the small cell to be sent to the AMS so that it provides the small cell with the correct geographic-based 'CandidateRFParameters' to choose from. Instead, the small cell can derive this 'CandidateRFParameters' list automatically using the macro cell data transmitted over the air in the SIB broadcast messages. In this manner, the example algorithm described below may cope with cell border conditions too, by emulating the UE cell reselection algorithm and choosing the Macro SIB data that is most likely to be selected by the UE in that RF environment.

In an optional example, the method may further comprise, measuring at least one metric, such as received signal power or received signal quality of each neighbouring macro cell BTS transmission, and decoding at least one parameter of the same neighbouring macro cell BTS broadcast message, wherein the at least one decoded parameter is a cell biasing metric. The plurality of neighbour cells may then be ranked, in some examples, based on the measured at least one metric and the at least one decoded parameter. The method may then include deriving a cell candidate list from the ranked plurality of neighbour cells.

In an optional example the method may further comprise selecting and using operating parameters from the derived cell candidate list. In some examples, in response to detecting that the selected operating parameters from the derived cell candidate list are being used by another small cell, the method may comprise selecting a next best candidate cell operating parameters from the derived cell candidate list.

In an optional example, detecting a plurality of macro cell BTS broadcast transmissions may comprise decoding multiple system information block, SIB, messages and measuring the macro cell metric(s), e.g. received signal power and or received signal quality. In some examples, detecting and decoding at least one parameter from each broadcast transmission may comprise identifying a Qoffset parameter from a first SIB broadcast from each of the plurality of macro cell BTSs that provides information about the macro cell BTS's neighbouring macro and small cells. In some examples, the at least one parameter acts as a signature for small cell neighbours to distinguish small cell neighbours from macro cell neighbours and the method further comprises: comparing the detected at least one Qoffset parameter with a first threshold value; and identifying therefrom whether the at least one Qoffset parameter indicates a macro cell or a small cell when deriving the cell candidate list of candidate operating parameters. In some examples, the method may further comprise automatically ranking the plurality of detected neighbour cells and their cell candidate lists based on the measured metric, e.g. a measured signal quality; and calculating a weighted score of each of the candidate cells in the cell candidate list based on the ranked plurality of detected neighbour cells. In some examples, the method may further comprise: comparing the calculated weighted score of each of the candidate cells with a second threshold value; and raising an alarm signal based on a candidate cell that scores below the second threshold value. In some examples, a comparison that results in a detected large negative value indicates that cell as a small cell when deriving the cell candidate list of candidate operating parameters.

In some examples, decoding multiple SIB messages may be performed to determine macro network cell reselection parameters, which may comprise extracting at least one of the following broadcast constant values from the SIB message: a 'cellSelectQualityMeasure', a SInter search value, a SIntra search.

According to a second aspect of the invention, a small cell base station is configured to use broadcast information to derive a cell candidate list from a neighbour cell list. The small cell base station comprises: a transceiver, and a signal processor operably coupled to the transceiver and configured to: perform a network listen, NWL, scan and identify a broadcast transmission from a plurality of macro cell base station, BTSs; detect at least one parameter from each broadcast transmission, wherein the at least one parameter acts as a signature for small cell neighbours to distinguish small cell neighbours from macro cell neighbours; and use the at least one parameter to derive a cell candidate list of candidate operating parameters.

According to a third aspect of the invention, a wireless communication system comprises a plurality of macro cell base stations, BTSs and at least one small cell base station configured to use information from a broadcast transmission to derive a cell candidate list from a neighbour cell list. The small cell base station comprises: a transceiver, and a signal processor operably coupled to the transceiver and configured to: perform a network listen, NWL, scan and identify a broadcast transmission from a plurality of macro cell base station, BTSs; detect at least one parameter from each broadcast transmission, wherein the at least one parameter acts as a signature for small cell neighbours to distinguish small cell neighbours from macro cell neighbours; and use the at least one parameter to derive a cell candidate list of candidate operating parameters.

These and other aspects, features and advantages of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Some examples of the invention find applicability in a wireless communication system comprising small cells, femto cells, other closed access residential small cells and/or the like. In particular, some of the examples of the invention find particular use in a presence cell context, when the small cells are re-configurable to support presence-related services. Thus, hereinafter, the term 'small cell' is used to encompass and refer to all such cell types, unless a particular application is described in relation to a particular one of the sub-groups. Furthermore, the term 'neighbour cell list' is used to describe the list of neighbouring base stations (be they macro base stations or small cells) transmitted by other base stations to allow handset devices to discover adjacent cells for cell reselection purposes. The term 'candidate cell list' is used to refer to a list of multiple sets of operating parameters that a small cell may be allowed to use for its transmission e.g. frequency/scrambling codes (in UMTS™) or frequency/PCI (in LTE™).

Examples of the invention propose a mechanism that would help an operator simplify its operations in frequency planning a deployment of small cells. In some examples, a mechanism is proposed for a small cell to optimise its choice of (or is allocated) multiple frequency/scrambling codes (in UMTS™) or frequency/PCI (in LTE™) based on a decoding operation of the SIB 11 (in UMTS™) or SIB4/SIB5 (in LTE™) message. Advantageously, no pre-configuring of small cell operating parameters, such as frequency/scrambling codes, is required. This is in contrast to known techniques whereby Network Operators have the small cell's operating parameters identified in a pre-preparation phase and then broadcast this information on SIB messages in order to pass the information to the small cell, in order to tell it what parameters to use. Known deployment techniques restrict the small cell to operate on a limited frequency, which may not be optimal for that location.

Examples of the invention are described with regard to various values that are either transmitted, received or measured. For example, here after, the term 'parameter' is used to generally encompass a value that can be used as signature, such as Qoffset. The term 'metric' is here after used to generally encompass measured values, such as signal power or signal quality. The term 'broadcast constant value' is here after used to generally encompass information transmitted by the macro base station in SIB messages.

Some examples of the invention allow the small cell to algorithmically determine the macro cell BTS that is closest (e.g. based on a strongest received signal level) and choosing transmitter operating parameters, such as frequency/scrambling codes (in UMTS™) or frequency/PCI (in LTE™), that are broadcast by that macro BTS (in case different macro BTSs broadcast different SIB parameters). In some examples of the invention, this concept may be extended to take into account multiple macro BTS's SIB broadcasts and make a scoring algorithm that biases this towards the strongest detected macro BTSs. In some examples, a mechanism is proposed to detect if a small cell frequency and scrambling code is contained in the Macro SIB neighbour cell list.

Some examples of the invention include adding further options to known rules to select from multiple operating parameters, such as frequency/scrambling codes, for example by adjusting a ranking of macro cell neighbours that the small cell can use. In this manner, it is easier for Network Operators to deploy small cells without having to set up numerous macro-cell relationships.

Figure 2:
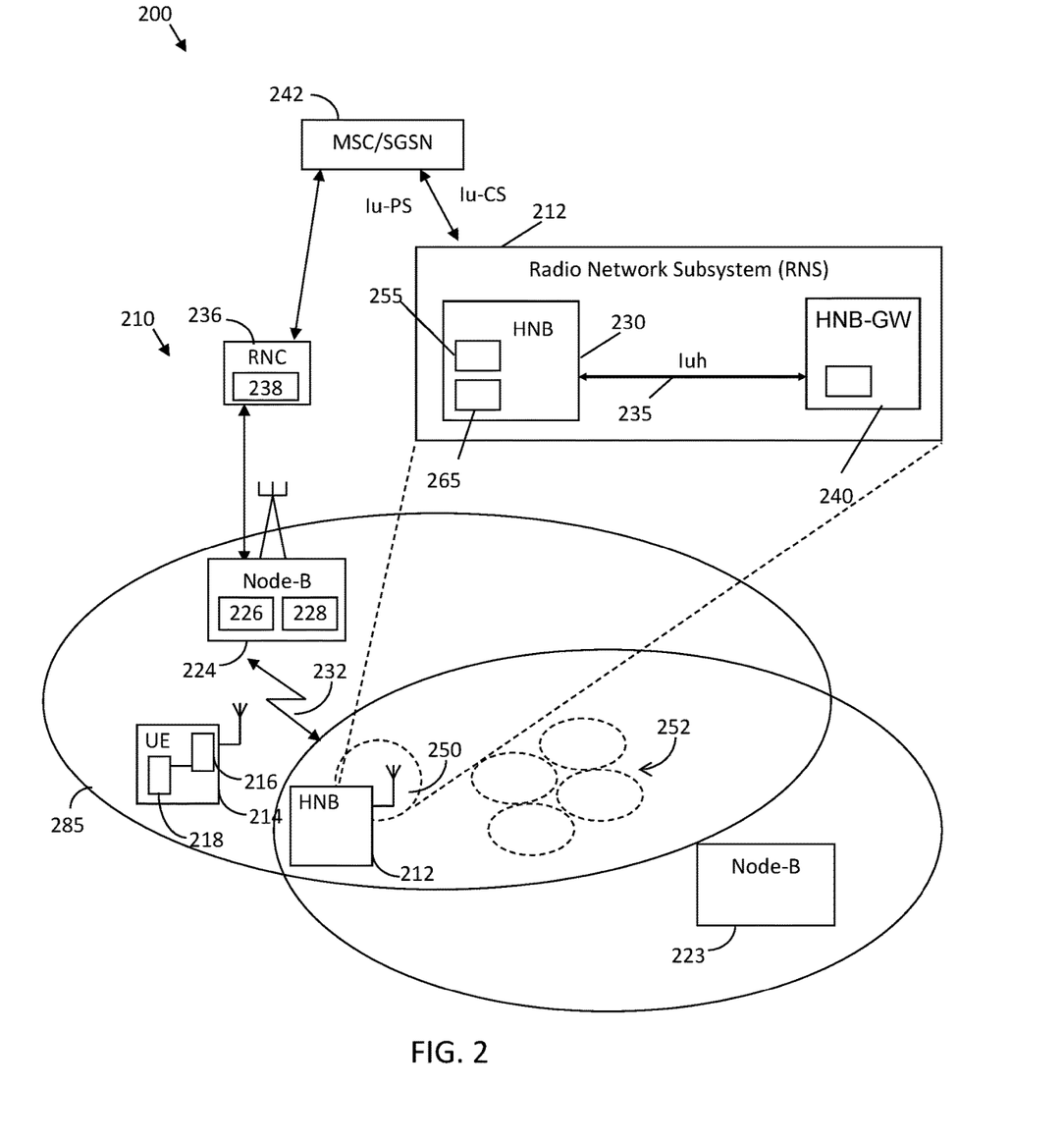
FIG. 2 illustrates a part of an example wireless communication system adapted in accordance with example embodiments of the invention.

Referring now to FIG. 2, a simplified example of part of a cellular communication system is illustrated and indicated generally at 200. In FIG. 2, there is illustrated an example of a communication system in a form of a third generation partnership project (3GPP™) Universal Mobile Telecommunication System (UMTS™) network 200 that comprises a combination of a macro cell 285 and a plurality of small cells 250, 252. For the example embodiment illustrated in FIG. 2, radio network sub-systems (RNSs) comprise two distinct architectures to handle the respective macro cell and small cell communications.

In the macro cell scenario, the RNS 210 comprises a controller in a form of a Radio Network Controller (RNC) 236 having, inter alia, one or more signal processing module(s) 238. The RNC 236 is operably coupled to at least one Node B 224 for supporting communications within the macro cell 285. The Node B 224 comprises signal processing module 226 and transceiver circuitry 228 arranged to enable communication with one or more wireless communication units located within the general vicinity of the macro communication cell 285, such as User Equipment (UE) 214. The RNC 236 is further operably coupled to a core network element 242, such as a serving general packet radio system (GPRS) support node (SGSN) and/or a mobile switching centre (MSC).

In a small cell scenario, an RNS 212 comprises base station, 230, also known as an access point or a Home Node B (HNB), that is arranged to perform a number of functions generally associated with a cellular communication base station, and a controller in a form of a Home Node B Gateway (HNB-GW) 240. As previously mentioned, in some example embodiments, the number of small cell base stations in a single macro cell may number a few or tens of thousands. As will be appreciated by a skilled artisan, a small cell base station HNB is a communication element that supports communications within a communication cell, such as a small cell 250, and as such may provide access to a cellular communication network via the small cell 250. One envisaged application is that an base station 230 may be purchased by a member of the public and installed in their home. The base station 230 may then be connected to an HNB-GW 240 via an Iuh interface 235, for example implemented over, say, the owner's broadband internet connection (not shown).

Thus, a small cell base station 230 may be considered as encompassing a scalable, multi-channel, two-way communication device that may be provided within, say, residential and commercial (e.g. office) locations, communication 'hotspots', etc., to extend or improve upon network coverage within those locations. An example of a typical third generation (3G) small cell base station for use within a 3GPP™ system may comprise some NodeB functionality and some aspects of radio network controller (RNC) 236 functionality. For the illustrated example embodiment, the small cell base station 230 comprises processor 265 and transceiver circuitry 255 arranged to enable communication with one or more wireless communication units located within the general vicinity of the small communication cell 250, such as User Equipment (UE) 214, via a wireless interface (Uu).

The 3G HNB-GW 240 may be coupled to the core network (CN) 242 via interfaces, such as circuit switched Iu interface, Iu-CS, and the packet switched Iu interface, Iu-PS, as shown. In this manner, the small cell base station 230 is able to provide voice and data services to a cellular handset, such as UE 214, in a small cell, in the same way as a conventional Node B would in a macro cell, but with the deployment simplicity of, for example, a Wireless Local Area Network (WLAN) access point.

In accordance with some example embodiments of the present invention, Node B 224 broadcasts transmissions throughout macro cell 285. Such broadcast transmissions are received by both UEs, such as UE 214, and small cells, such as small cell base station 212. In some examples, multiple Node Bs 223, 224 each broadcast transmissions that may comprise system information block, SIB, messages. In some examples, a Qoffset parameter is included in a SIB broadcast transmission that provides information about that macro cell BTS's neighbouring macro and small cells. In some examples, the SIB messages include SIB3 broadcast transmission messages, such as: a 'cellSelectQualityMeasure' signal quality value, a SInter search value, a SIntra search, which contain broadcast constant values that may be extracted.

In accordance with some example embodiments of the present invention, a signal processor, such as processor 265 of small cell base station 230 of FIG. 2, is configured to perform a network listen, NWL, scan and identify broadcast transmissions from a plurality of macro cell base station, BTSs; detect at least one parameter from each broadcast transmission, wherein the at least one parameter acts as a signature for small cell neighbours to distinguish small cell neighbours from macro cell neighbours; and uses the at least one parameter to derive a cell candidate list of candidate operating parameters. One example of the operation of processor 265 is described in FIG. 4.

In accordance with some examples, processor 265 may also be configured to measure at least one metric of each macro cell BTS broadcast transmission, wherein the metric is at least one of: a signal quality, a signal power, and thereafter rank the plurality of detected neighbour cells based on the decoded at least one parameter and the measured at least one metric. The processor 265 may then derive a cell candidate list from the ranked plurality of detected neighbour cells.

In some examples of the invention, the processor 265 of the small cell base station (sometimes referred to as an access point(AP)) may select and use operating parameters from the derived cell candidate list. In some examples, in response to detecting that the selected operating parameters from the derived cell candidate list are being used by another small cell, the method may comprise selecting a next best candidate cell operating parameters from the derived cell candidate list.

In examples that use a SIB broadcast transmission, the processor 265 detects at least one parameter from each macro cell BTS broadcast transmission to identify respective Qoffset parameters from each of the plurality of macro cell BTSs, which provides information about the macro cell BTS's neighbouring macro and small cells. In some examples, the at least one parameter acts as a signature for small cell neighbours to distinguish small cell neighbours from macro cell neighbours. For example, the processor 265 may compare the detected at least one Qoffset parameter with a first threshold value; and identify therefrom whether the at least one Qoffset parameter indicates a macro cell or a small cell. This information is then used when deriving the cell candidate list of candidate operating parameters.

In some examples, the processor 265 may automatically rank the plurality of detected neighbour cells and their cell candidate lists based on at least a measured metric, such as a measured signal power or signal quality and an optional broadcast constant "cellSelectQualityMeasure" value in SIB3.

In some examples, a comparison against a first threshold, such as a cell_qOffset_Threshold value that results in a detected large negative value (in the context of these examples the term 'large negative values' encompasses values in the order of −20 dB or below) indicates that cell as a small cell when deriving the cell candidate list of candidate operating parameters. Thus, in this manner, the large negative value can be used as a signature for the small cell in order to determine whether or not it is a candidate UARFCN/scrambling code to use.

Figure 3:
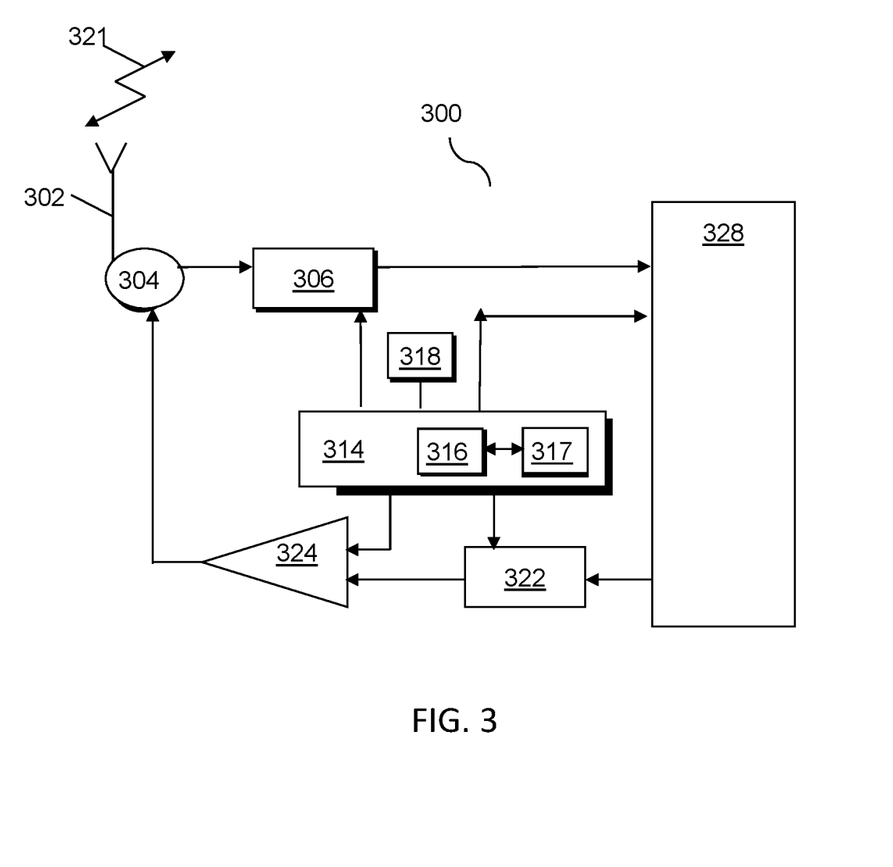
FIG. 3 illustrates an example block diagram of a base station (for example a HNB or presence cell) configured to operate in accordance with an example embodiment of the invention.

Referring now to FIG. 3, a block diagram of a wireless communication unit, adapted in accordance with some example embodiments of the invention, is shown. In practice, purely for the purposes of explaining embodiments of the invention, the wireless communication unit is described in terms of a wireless small cell base station 300, such as small cell base station 230 of FIG. 2. The wireless small cell base station 300 contains an antenna 302, antenna array, or plurality of antennas for receiving and transmitting signals 321 coupled to an antenna switch or duplexer 304 that provides isolation between receive and transmit chains within the wireless small cell base station 300. One or more receiver chains, as known in the art, include receiver front-end circuitry 306 (effectively providing reception, filtering and intermediate or base-band frequency conversion). The receiver front-end circuitry 306 is coupled to a signal processor 328 (generally realized by a digital signal processor (DSP)). A skilled artisan will appreciate that the level of integration of receiver circuits or components may be, in some instances, implementation-dependent.

The controller 314 maintains overall operational control of the wireless small cell base station 300. The controller 314 is also coupled to the receiver front-end circuitry 306 and the signal processor 328. In some examples, the controller 314 is also coupled to a buffer module 317 and a memory device 316 that selectively stores operating regimes, such as decoding/encoding functions, synchronization patterns, code sequences, and the like, as well as information related to UEs that it is communicating with. A timer 318 is operably coupled to the controller 314 to control the timing of operations (e.g. transmission or reception of time-dependent signals) within the base station 300.

As regards the transmit chain, this essentially includes an input module 320, coupled in series through transmitter/modulation circuitry 322 and a power amplifier 324 to the antenna 302, antenna array, or plurality of antennas. The transmitter/modulation circuitry 322 and the power amplifier 324 are operationally responsive to the controller 314. In accordance with examples of the invention, base station 300 is configured such that the transmitter and receiver circuits (often referred to as a transceiver) are configured to communicate with a plurality of mobile handsets, e.g. user of UE 214 of FIG. 2.

In accordance with examples of the invention, the wireless small cell base station 300 includes a transceiver, and signal processor 328 (or controller 314 with signal processing capabilities) is configured to use information received from a broadcast transmission to derive a cell candidate list from a neighbour cell list. The signal processor 328 is configured to: perform a network listen, NWL, scan and identify a broadcast transmission from a plurality of macro cell base station, BTSs; detect at least one parameter from each broadcast transmission, wherein the at least one parameter acts as a signature for small cell neighbours to distinguish small cell neighbours from macro cell neighbours; and use the at least one parameter to derive a cell candidate list of candidate operating parameters. The signal processor 328 may also be configured to select a frequency/scrambling code to use, for example based on a ranked plurality of detected neighbour cells.

The signal processor 328 may also be configured to detect a plurality of macro cell BTS broadcast transmissions and decode multiple system information block, SIB, messages and to determine at least one metric, such as signal power and/or signal quality of each received broadcast transmission. In some examples (in the case of UMTS™), the signal processor 328 decodes multiple SIB3 messages to obtain multiple 'cellSelectQualityMeasure' broadcast constant values.

In some examples, the signal processor 328 decodes multiple SIB messages to identify candidate neighbour cell entries, and, for example, decoding a qOffset parameter of the SIB broadcast transmission and automatically building a Candidate Set based on SIB qOffset parameter, when the qOffset<small cell_qOffset_Threshold.

In this manner, a first threshold may be employed, such as a 'small cell_qOffset_Threshold', to identify whether or not the neighbour list entry is intended to be used by a small cell. For example, if the qOffset value broadcast in the SIB for this neighbour list entry is set at −30 dB or −40 dB, this being below the threshold value of −20 dB, this may identify that neighbour cell as a small cell. Any value above the threshold identifies it as macro cell neighbour. In this manner, the decoding of a parameter such as a qOffset value, followed by a comparison with a suitable first threshold value, e.g. cell_qOffset_Threshold, may be used to provide a cell signature to identify a cell type, for example to distinguish small cell neighbours from macro cell neighbours.

In some examples, the signal processor 328 may additionally be configured to calculate a weighted score of each of the candidate cells, wherein the weighted score may be additionally based on the value of a qOffset parameter from the SIB or a presence of an entry of the access point in a SIB3 Neighbour List.

In one example, the weighted score of each of the candidate cells may be compared to a second threshold. If the signal processor 328 determines that the overall weighted score of a candidate cell falls below the second threshold, or if the overall score is, say, zero, an alarm may be raised to indicate that the small cell's candidate list is likely to be inaccurate, as the small cell cannot determine suitable frequency and scrambling codes intended for small cell operation.

In some examples, the signal processor 328 may automatically select a frequency and/or Scrambling code based solely on the derived cell Candidate List (i.e. without a specified list of "RFCandidateParameters" being provided to the small cell by the AMS).

A memory device 316, operably coupled to the signal processor 328, may be configured to store data relating to the measured metrics of signal quality and/or signal power of each detected macro cell BTS broadcast transmission. The memory device 316 may also be configured to store the cell Candidate List generated from the ranked plurality of detected neighbour macro cells list based on the decoded broadcast constant values and parameter.

The signal processor 328 in the transmit chain may be implemented as distinct from the signal processor in the receive chain. Alternatively, a single processor may be used to implement a processing of both transmit and receive signals, as shown in FIG. 3. Clearly, the various components within the base station 300 can be realized in discrete or integrated component form, with an ultimate structure therefore being an application-specific or design selection.

Figure 4:
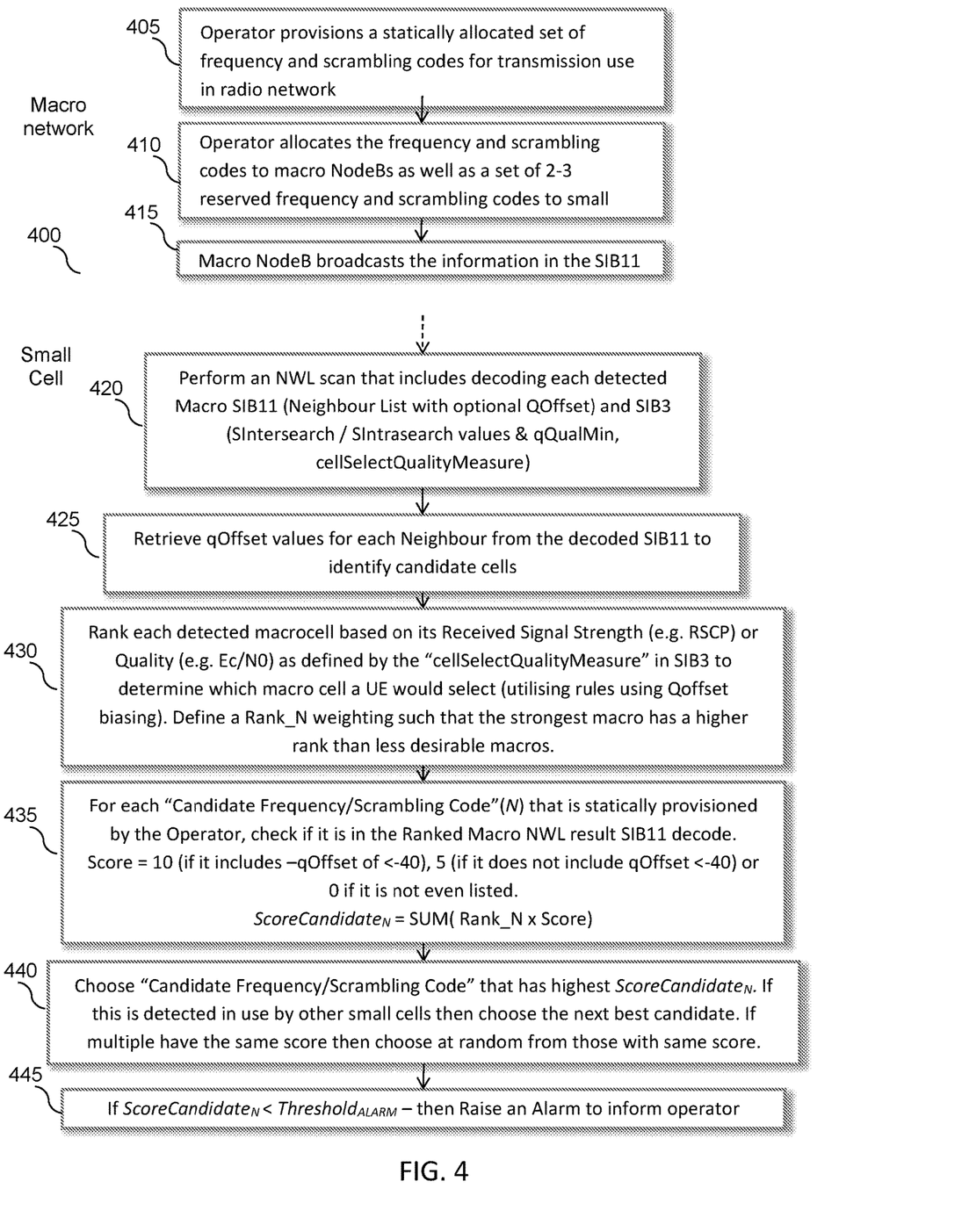
FIG. 4 illustrates an example flowchart of a small cell deployment process, in accordance with an example embodiment of the invention.

FIG. 4 illustrates a flowchart 400 of a small cell deployment process in accordance with an example embodiment of the invention. On the Core (Macro) Network side, at 405, the Network Operator provisions a statically allocated set of frequency and scrambling codes for use in the system. At 410, the Network Operator allocates the frequency and scrambling codes to macro BTSs, such as Node B 210 from FIG. 3, and a set of 2-3 reserved frequency and scrambling codes to presence cells. At 415, the macro cell BTS broadcasts cell information in the SIB.

On the small cell side, an access point, such as HNB 230 of FIG. 3, performs a NWL operation at 420. At this point, the NWL scan operation includes decoding each detected Macro cell's SIB (Neighbour List with optional QOffset) and SIB3 to obtain one or more decoded parameters. In future standards, the small cell may decode SIntersearch and/or SIntrasearch values, and/or qQualMin, and/or cellSelectQualityMeasure or other such similar broadcast constant values.

At 425, the small cell retrieves qOffset values for each neighbour from, say, the decoded SIB11, in order to identify candidate cells. In this manner, in accordance with examples of the invention, one or more of the decoded parameters may be used to bias the algorithm using the at least one parameter to derive a cell Candidate List of candidate operating parameters.

At 430, the small cell is configured to rank each detected macrocell based on the decoded broadcast constant values and at least one measured metric, e.g. its Received Signal Strength (e.g. RSCP) or Quality (e.g. Ec/N0) as defined by the "cellSelectQualityMeasure" in SIB3 to determine which macro cell a UE would select (utilising rules using Qoffset biasing). Thereafter, the small cell defines and allocates a Rank_N weighting, such that the strongest macro cell has a higher rank than less desirable macro cells.

At 435, for each "Candidate Frequency/Scrambling Code"(N) that is statically provisioned by the Network Operator, the small cell checks to see whether it is in the Ranked Macro NWL result SIB decode. One example ranking mechanism could be:
Score='10' (if it includes qOffset of <−40),
'5' (if it does not include qOffset<−40) or
'0' if it is not even listed.
A rating (candidate score) may then be generated in 435, for example based on:

$$\text{ScoreCandidate}_N = \text{SUM}(\text{Rank}\_N \times \text{Score})$$

At 440, the small cell may then select a 'Candidate frequency/scrambling code' that has the highest ScoreCandidate$_N$. If the small cell then detects that this frequency/scrambling code is in use by other small cells, then the small cell would need to select the next best candidate. If multiple macro cell calculations result in having the same score, then the small cell may select at random from those 'same-score' macro cells.

At 445, if the small cell scoring algorithm results in a: ScoreCandidate$_N$<Threshold$_{ALARM}$, then in some examples the small cell may raise an alarm to inform the Network Operator of a failure or a problem within the system, for example in that the small cell may be unable to see/hear a macro cell transmission.

Figure 5:
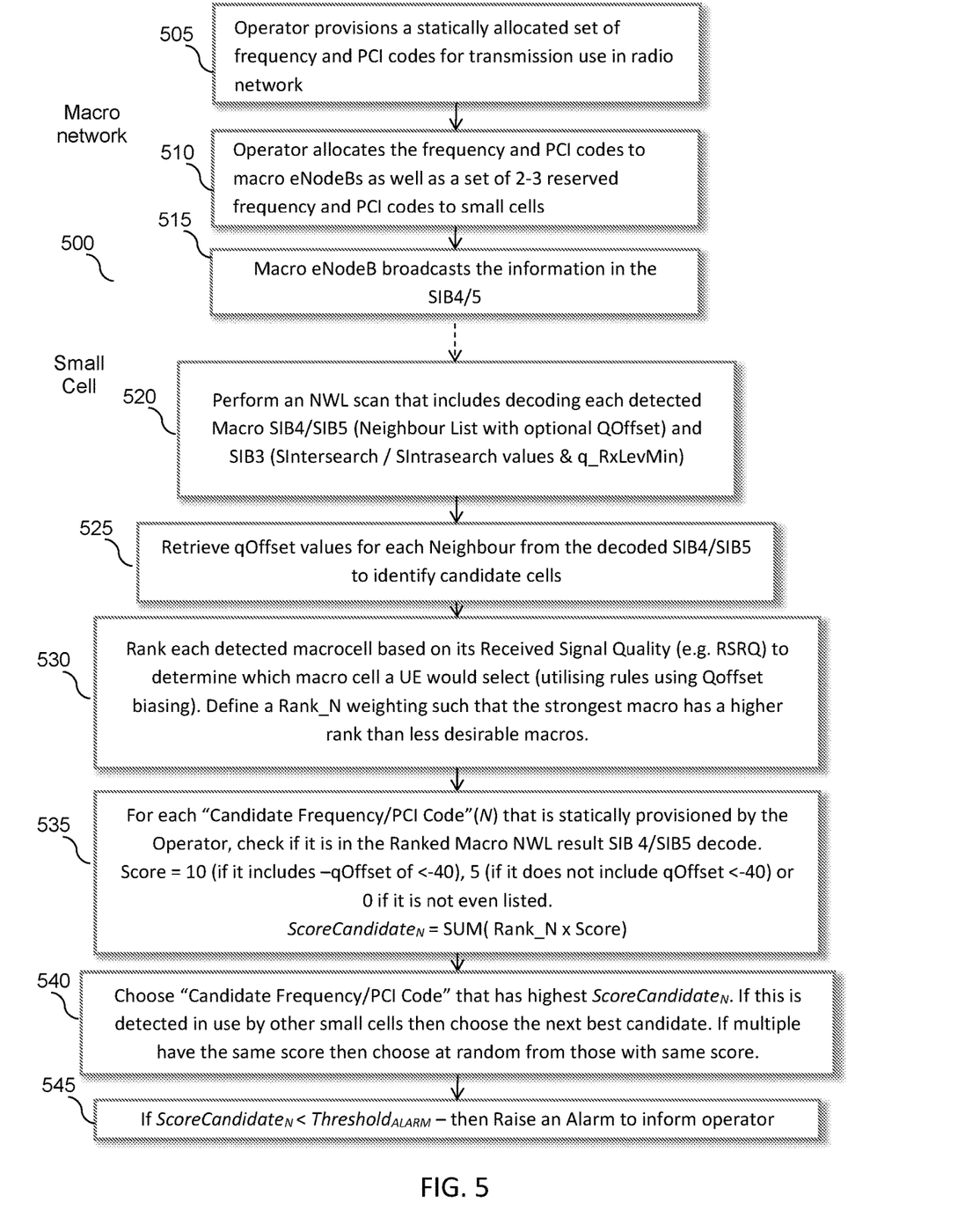
FIG. 5 illustrates an example flowchart of a small cell deployment process in an LTE™ system, in accordance with an example embodiment of the invention.

Referring now to FIG. 5, an example flowchart 500 of a small cell deployment process in an LTE™ system is illustrated in accordance with an example embodiment of the invention. On the Core (macro cell) Network side, at 505, the Network Operator provisions a statically allocated set of frequency and PCI codes for transmission use in the system. At 510, the Network Operator allocates the frequency and PCI codes to macro eNodeBs, as well as a set of 2-3 reserved frequency and PCI codes to presence cells. At 515, the macro eNodeB broadcasts cell information in the SIB, which is in the SIB4 or SIB5 in LTE™.

On the small cell side, an access point, such as HNB 230 of FIG. 2 or FIG. 3, performs a NWL operation at 520. At this point, the NWL scan operation includes decoding each detected Macro cell's SIB (SIB4/SIB5), containing the Neighbour List with optional QOffset, and SIB3 to obtain one or more decoded parameters.

At 525, the small cell retrieves qOffset value parameters for each neighbour from the decoded SIB4/SIB5, in order to identify candidate cells. In this manner, in accordance with examples of the invention, one or more of the decoded parameters may be used to bias the algorithm using the at least one parameter to derive a cell Candidate List of candidate operating parameters. At 530, the small cell may be configured to rank each detected macrocell based on the detected at least one parameter and one or more measured metrics, such as its Reference Signal Received Power (e.g. RSRP), to determine which macro cell a UE would select (utilising rules using Qoffset biasing). Thereafter, the small cell may define and allocates a Rank_N weighting, such that the strongest macro cell has a higher rank than less desirable macro cells.

At 535, for each "Candidate Frequency/PCI Code"(N) that is statically provisioned by the Network Operator, the small cell checks to see whether it is in the Ranked Macro NWL result SIB decode. One example ranking mechanism could be:

Score='10' (if it includes qOffset of <−40),
'5' (if it does not include qOffset<−40) or
'0' if it is not even listed.

A rating (candidate score) may then be generated in 535, for example based on:

$$ScoreCandidate_N = SUM(Rank\_N \times Score)$$

At 540, the small cell may then select a 'Candidate frequency/PCI code' that has the highest $ScoreCandidate_N$. If the small cell then detects that this frequency/scrambling code is in use by other small cells, then the small cell would need to select the next best candidate. If multiple macro cell calculations result in having the same score, then the small cell may select at random from those 'same-score' macro cells.

At 545, if the small cell scoring algorithm results in a: $ScoreCandidate_N < Threshold_{ALARM}$, then in some examples the small cell may raise an alarm to inform the Network Operator of a failure or a problem within the system, for example in that the small cell may be unable to see/hear a macro cell transmission.

Figure 6:
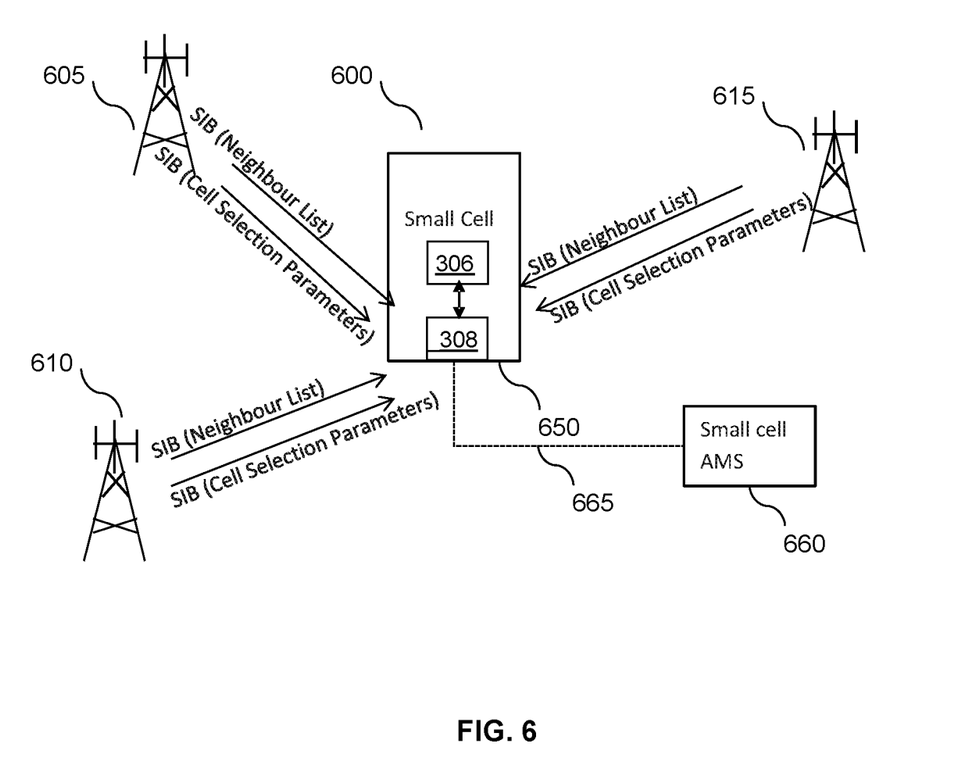
FIG. 6 illustrates a part of an example wireless communication system whereby neighbour cell lists are broadcast in accordance with an example embodiment of the invention.

Referring now to FIG. 6, a part of an example wireless communication system 600 is illustrated whereby neighbour cell lists are broadcast in accordance with an example embodiment of the invention. FIG. 6 shows three local macro cell base transceiver stations (BTSs), for example NodeBs, 605, 610, 615, each of which may broadcast different SIB11 (Neighbour lists) and SIB3 (Cell Reselection parameters).

The small cell 650 has a network listen (NWL) receiver, which can measure metrics, such as the relative signal power levels and/or perform a quality measurement on the received signals, that are broadcast by macro BTSs 605, 610, 615. In accordance with example embodiments, the small cell 650 comprises a processor, such as signal processor 328 or controller 314 from FIG. 3, configured to rank these relative signal power levels in the same manner as a user equipment (UE) receiver that is theoretically at the same location as the small cell 650. The small cell 650 is connected to a small cell AMS 660, which provides the small cell with a 'Candidate frequency/scrambling code list' via communication link 665. Table 1 below shows a UMTS™-based example of the three local macro cell NWL results of SIB3 and SIB11 from each macro cell.

TABLE 1

| | CellId | Frequency | ScrCode | EcNO | RSCP | SIB3 | | |
|---|---|---|---|---|---|---|---|---|
| | | | | | | SInterSearch | SintraSearch | qQualMin |
| Macro 1 | 1000 | 10564 | 461 | −8 | −80 | 10 | 12 | −18 |
| Macro 2 | 2000 | 10564 | 492 | −3 | −75 | 10 | 12 | −18 |
| Macro 3 | 3000 | 10661 | 461 | −12 | −97 | 10 | 12 | −18 |

| | SIB3 CellReselection MeasureQuality | SIB11 | | | |
|---|---|---|---|---|---|
| | | UARFCN | ScrCode | Qoffset | Neighbour Relationsh |
| Macro 1 | CPICH_ECNO | 10564 | 461 | 0 | Macro CellId 1000 |
| | | 10564 | 492 | 0 | Macro CellId 2000 |
| | | 10661 | 461 | 3 | Macro CellId 3000 |
| | | 10661 | 2 | −50 | Candidate Set#2 |
| Macro 2 | CPICH_ECNO | 10564 | 461 | 0 | Macro CellId 1000 |
| | | 10564 | 492 | 0 | Macro CellId 2000 |
| | | 10661 | 461 | 3 | Macro CellId 3000 |
| | | 10661 | 1 | −50 | Candidate Set#1 |
| | | 10661 | 2 | −50 | Candidate Set#2 |
| Macro 3 | CPICH_ECNO | 10564 | 461 | 0 | Macro CellId 1000 |
| | | 10564 | 492 | 0 | Macro CellId 2000 |
| | | 10661 | 461 | 3 | Macro CellId 3000 |
| | | 10661 | 1 | −50 | Candidate Set#1 |

The small cell 650 is then able to check all of the ranked neighbour relationships that are broadcast by each of the detected macro BTSs against those in the received 'Candidate frequency & scrambling code list'.

In one example scenario, receiver front end 306 of small cell 650 receives the following Candidate Frequency & Scrambling Codes from the small cell AMS 660 are:
(i) Candidate Set #1: UARFCN: 10661, Scrambling Code: 1;
(ii) Candidate Set #2: UARFCN: 10661, Scrambling Code: 2; and
(iii) Candidate Set #3: UARFCN: 10661, Scrambling Code: 3.

In this example, let us assume that small cell 650 observes that:
(i) Macro cell BTS 1 broadcasts, say, four neighbour relationships, including Candidate Set #2 only;
(ii) Macro cell BTS 2 broadcasts, say, five neighbour relationships including Candidate Sets #1 & #2;
(III) Macro cell BTS 3 broadcasts, say, four neighbour relationships including Candidate Set #1 only; and
(iv) None of the Macro cell BTSs broadcast Candidate Set #3.

From this example, it can be seen that the macro cell BTSs would be selected by the processor 308 of small cell 650 in the following order:
(1) Macro cell BTS 2 would be selected as the 'strongest macro cell BTS' (as it has the highest received signal to noise ratio of EcNO of −3 dB), then
(2) Macro cell BTS 1 (has a received signal to noise ratio EcNO of −8), then
(3) Macro cell BTS 3 (has a received signal to noise ratio EcNO of −12).

Thereafter, from this example, it can be seen that the macro cell BTSs would be selected by the processor 308 of small cell 650 in the following order, where processor 308 has allocated a RANK_N to each of the Macro cell BTSs in turn:
(1) Macro 2=3 (highest weighting);
(2) Macro 1=2; and
(3) Macro 3=1 (lowest weighting).

For each of the Candidate sets processor 308 of small cell 650 evaluates the ranking based on whether the small cell itself is identified within the broadcast SIB11 transmission by the respective macro cells:
Candidate Set #1:
(1) Macro 2: RANK_N=3×Score=0 (Not in Neighbour List)=0
(2) Macro 1: RANK_N=2×Score=10 (In Neighbourlist with qOffset<−40)=20
(3) Macro 3: RANK_N=1×Score=10 (In Neighbourlist with qOffset<−40)=10
TOTAL=30
Candidate Set #2:
(1) Macro 2: RANK_N=3×Score=10 (In Neighbourlist with qOffset<−40)=30
(2) Macro 1: RANK_N=2×Score=10 (In Neighbourlist with qOffset<−40)=20
(3) Macro 3: RANK_N=1×Score=0 (Not in Neighbourlist)=0
TOTAL=50
Candidate Set #3:
(1) Macro 2: RANK_N=3×Score=0 (Not in Neighbourlist)=0
(2) Macro 1: RANK_N=2×Score=0 (Not in Neighbourlist)=0
(3) Macro 3: RANK_N=1×Score=0 (Not in Neighbourlist)=0
TOTAL=0

In this example the Candidate Set #2 would be the preferred set, since the strongest macro cell BTS will be broadcasting only this Candidate Set.

In a further example, and assuming a $Threshold_{ALARM}$ was set=10, then the small cell AP may raise an alarm within the small cell AMS 660 system with regard to Candidate Set #3, in order to inform the Network Operator that the Candidate Set #3 was not in a macro cell neighbour list, and as such the macro cell may be misconfigured or UEs/handsets in this macro cell will be unlikely to ever find the small cell 650 if it were to use this Candidate Set #3.

In accordance with some examples of the invention, a mechanism for automatic Candidate Set detection is also supported. For example, it is envisaged that it is possible for the small cell 650 to automatically derive a Candidate Set by examining which Neighbour lists include QOffsets of, say, <−40, since that level would typically indicate that the macro cell BTS treats this neighbour as a small cell (e.g. a FemtoCell). As such, it would be very unusual to apply such a strong negative qOffset biasing to a high powered macro cell.

In this manner, by simply examining if a macro cell BTS is broadcasting a qOffset<−40, the small cell 650 is able to build its CandidateSet without necessarily needing to be informed of CandidateSet data by the small cell AMS 660. In some examples, a macro cell Network Operator could follow this as a cell planning convention, thereby simplifying the Neighbour relationship management for the mobile cell planning teams. Furthermore, the macro cell Network Operator would not need to ensure that the small cell AMS 660 is configured correctly if the cell planning rules on a particular macro cell changed.

It is known that small cells are often randomly scattered across large geographic regions (e.g. in the US different counties may employ different frequency spectrum use). This means, in the example of FIG. 6, that the location of small cell 650 must be known by the small cell AMS 660 in order to provide the correct candidate sets for that specific region. Using the example techniques described herein, then the small cell AMS 660 does not need to know when the small cell 650 is to be deployed. Often small cells, such as small cell 650 are moved by individuals between two or more locations, and doing so requires a manual re-configuration of the small cell AMS 660 when the device is moved. This often involves the end-user having to contact a system support representative in order to relocate the small cell 650 in their database. The example concepts herein described may remove any need for such a manual small cell AMS 660 re-configuration process.

In some examples, it is envisaged that the concepts described herein may be employed in a self-organising network (SON), which would aim to provide a work-around solution to the current known technique of restricting the small cell to operate on a limited frequency which may not be optimal for that location. In this context, in an ideal situation, a Network Operator may deploy both macro cells and small cells and set up their respective NWL scans to create a self-organising network.

Those skilled in the art will recognise and appreciate that the specifics of the specific examples described are merely illustrative of some embodiments and that the teachings set forth herein are applicable in a variety of alternative settings. For example, implementations within cellular communication systems conforming to different standards are contemplated and are within the scope of the various teachings described.

The signal processing functionality of the embodiments of the invention, particularly the function of the signal processor 265 in a small cell 212, 650, may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous.

Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A method for a small cell access point to use broadcast information to derive a cell candidate list from a neighbour cell list, the method comprising, at the small cell access point:
    performing a network listen, NWL, scan and identifying a broadcast transmission from a plurality of macro cell base station, BTSs;
    detecting at least one parameter from each broadcast transmission by identifying a Qoffset parameter from decoding a first system information block, SIB, message that provides information about each macro cell BTS's neighbouring macro and small cells to determine neighbour information and network cell reselection parameters, wherein the at least one parameter acts as a signature for small cell neighbours to distinguish small cell neighbours from macro cell neighbours by;
    comparing the detected at least one Qoffset parameter with a first threshold value; and
    identifying therefrom whether the at least one Qoffset parameter indicates a macro cell or a small cell when deriving a cell candidate list of candidate operating parameters; and
    using the at least one parameter to derive a cell candidate list of candidate operating parameters.

2. The method of claim 1, further comprising:
    measuring at least one metric of each macro cell BTS broadcast transmission, wherein the at least one metric is at least one of: a signal quality, a signal power;
    ranking the plurality of neighbour cells based on the measured at least one metric and the detected at least one parameter; and
    deriving a cell candidate list from the ranked plurality of neighbour cells.

3. The method of claim 1, further comprising selecting and using operating parameters from the derived cell candidate list.

4. The method of claim 3, wherein, in response to detecting that the selected operating parameters from the derived cell candidate list are being used by another small cell, selecting a next best candidate cell operating parameters from the derived cell candidate list.

5. The method of claim 1, wherein a comparison that results in a detected large negative value indicates that cell as a small cell when deriving the cell candidate list of candidate operating parameters.

6. The method of claim 5, further comprising:
    automatically ranking the plurality of detected neighbour cells and their cell candidate lists based on a measured at least one metric; and
    calculating a weighted score of each of the candidate cells in the candidate cell list based on the ranked plurality of detected neighbour cells.

7. The method of claim 6, further comprising:
    comparing the calculated weighted score of each of the candidate cells with a second threshold value; and
    raising an alarm signal based on a candidate cell that scores below the second threshold value.

8. The method of claim 6, wherein decoding multiple SIB messages comprises decoding multiple messages to determine cell reselection parameters and comprises extracting at least one of the following broadcast constant values from the SIB message: a 'cellSelectQualityMeasure' value, a Sinter search value, a Sintra search value.

9. A small cell base station is configured to use broadcast information to derive a cell candidate list from a neighbour cell list, the small cell base station comprises:
    a transceiver, and
    a signal processor operably coupled to the transceiver and configured to:
        perform a network listen, NWL, scan and identify a broadcast transmission from a plurality of macro cell base station, BTSs;
        detect at least one parameter from each broadcast transmission by identifying a Qoffset parameter from decoding a first system information block, SIB, message that provides information about each macro cell BTS's neighbouring macro and small cells to determine neighbour information and network cell reselection parameters, wherein the at least one parameter acts as a signature for small cell neighbours to distinguish small cell neighbours from macro cell neighbours by;
        compare the detected at least one Qoffset parameter with a first threshold value; and
        identify therefrom whether the at least one Qoffset parameter indicates a macro cell or a small cell when deriving a cell candidate list of candidate operating parameters; and
        use the at least one parameter to derive a cell candidate list of candidate operating parameters.

10. The small cell base station of claim 9, wherein the signal processor is further configured to:
    measure the at least one metric of each macro cell BTS broadcast transmission, wherein the metric is at least one of: a signal quality, a signal power;
    rank the plurality of neighbour cells based on the measured at least one metric and detected at least one parameter; and
    derive a cell candidate list from the ranked plurality of detected neighbour cells.

11. The small cell base station of claim 9, wherein the signal processor is further configured to select and use operating parameters from the derived cell candidate list.

12. The small cell base station of claim 11, wherein, in response to detecting that the selected operating parameters from the derived cell candidate list are being used by another small cell, the signal processor is further configured to select a next best candidate cell operating parameters from the derived cell candidate list.

13. The small cell base station of claim 9, wherein a comparison that results in a detected large negative value indicates that cell as a small cell when the signal processor derives the cell candidate list of candidate operating parameters.

14. A wireless communication system comprising a plurality of macro cell base stations, BTSs, and at least one small cell base station configured to use broadcast information to derive a cell candidate list, the small cell base station comprising:

a transceiver, a signal processor operably coupled to the transceiver and configured to:

perform a network listen, NWL, scan and identify a broadcast transmission from a plurality of macro cell base station, BTSs;

detect at least one parameter from each broadcast transmission by identifying a Qoffset parameter from decoding a first system information block, SIB, message that provides information about each macro cell BTS's neighbouring macro and small cells to determine neighbour information and network cell reselection parameters, wherein the at least one parameter acts as a signature for small cell neighbours to distinguish small cell neighbours from macro cell neighbours by;

compare the detected at least one Qoffset parameter with a first threshold value; and identify therefrom whether the at least one Qoffset parameter indicates a macro cell or a small cell when deriving a cell candidate list of candidate operating parameters; and use the at least one parameter to derive a cell candidate list of candidate operating parameters.

* * * * *